(12) United States Patent
McCarthy

(10) Patent No.: US 8,188,411 B2
(45) Date of Patent: May 29, 2012

(54) PROJECTILE GUIDANCE SYSTEM INCLUDING A COMPACT SEMI-ACTIVE LASER SEEKER WITH IMMERSED FILTER STACK AND FIELD LENS

(75) Inventor: Patrick L. McCarthy, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 349 days.

(21) Appl. No.: 12/582,915

(22) Filed: Oct. 21, 2009

(65) Prior Publication Data

US 2011/0089286 A1 Apr. 21, 2011

(51) Int. Cl.
*F41G 7/22* (2006.01)
*F41G 7/26* (2006.01)
*F42B 15/01* (2006.01)
*F41G 7/00* (2006.01)
*F42B 15/00* (2006.01)

(52) U.S. Cl. ...... 244/3.16; 244/3.1; 244/3.11; 244/3.13; 244/3.15

(58) Field of Classification Search .......... 244/3.1–3.19, 244/3.2–3.3; 89/1.11; 342/52–56, 61–66; 343/700 R, 725; 250/200, 201.1, 203.1, 250/203.2, 203.3, 203.6, 336.1, 338.1, 353
See application file for complete search history.

(56) References Cited

U.S. PATENT DOCUMENTS

| | | | | |
|---|---|---|---|---|
| 3,296,443 A | * | 1/1967 | Argyle | 244/3.16 |
| 3,944,167 A | * | 3/1976 | Figler et al. | 244/3.16 |
| 3,971,939 A | * | 7/1976 | Andressen | 244/3.16 |
| 3,977,628 A | * | 8/1976 | Barron | 244/3.16 |
| 4,006,356 A | * | 2/1977 | Johnson et al. | 244/3.16 |
| 4,131,248 A | * | 12/1978 | Berglund | 244/3.16 |
| 4,155,521 A | * | 5/1979 | Evans et al. | 244/3.16 |
| 4,286,760 A | * | 9/1981 | Couderc et al. | 244/3.16 |
| 4,436,260 A | * | 3/1984 | Donelan | 244/3.16 |
| 4,678,142 A | | 7/1987 | Hirschfeld | |
| 4,701,602 A | * | 10/1987 | Schaefer et al. | 244/3.16 |
| 5,259,568 A | | 11/1993 | Amon et al. | |
| 6,111,241 A | * | 8/2000 | English et al. | 250/203.2 |
| 6,262,800 B1 | * | 7/2001 | Minor | 244/3.16 |
| 6,606,066 B1 | | 8/2003 | Fawcett et al. | |
| 6,924,772 B2 | * | 8/2005 | Kiernan, Jr. et al. | 343/725 |
| 7,049,597 B2 | * | 5/2006 | Bodkin | 250/353 |

(Continued)

FOREIGN PATENT DOCUMENTS

EP 1770349 A1 4/2007

*Primary Examiner* — Bernarr Gregory
(74) *Attorney, Agent, or Firm* — Eric A. Gifford

(57) ABSTRACT

A compact SAL seeker for a projectile guidance system comprises an optical sub-assembly to focus incident electro-magnetic radiation (EMR) such that target bearing in object space is mapped to a spatial irradiance in image space and a detector sub-assembly to generate at least one guidance signal in response to the position of the centroid of the focused EMR. The optical sub-assembly includes an integrated filter stack of a primary optical element, a spreader, a filter and secondary optical element in which at least one and typically both of the spreader and filter are immersed within the optical media of the stack. The detector sub-assembly may include a field lens in which the detector is immersed. Immersion reduces the number of "air-to-glass" interfaces, hence improves optical throughput. The detector sub-assembly may be integrally formed with a mounting bracket adapted to mate with mounting features on the optical sub-assembly to provide a self-aligned seeker.

23 Claims, 8 Drawing Sheets

U.S. PATENT DOCUMENTS

| | | |
|---|---|---|
| 7,183,966 B1 * | 2/2007 | Schramek et al. .............. 342/53 |
| 7,276,681 B2 * | 10/2007 | Alexander et al. ........... 244/3.13 |
| 7,530,528 B2 | 5/2009 | Jenkins et al. |
| 7,530,529 B2 | 5/2009 | Bock |
| 7,540,449 B2 * | 6/2009 | Jenkins et al. ............... 244/3.16 |
| 7,575,191 B2 | 8/2009 | Layton |
| 2007/0187546 A1 | 8/2007 | Layton |
| 2007/0290096 A1 * | 12/2007 | Jenkins et al. ............... 244/3.16 |

* cited by examiner $$\Delta X = \frac{(A+D) - (B+C)}{A+B+C+D}$$

$$\Delta Y = \frac{(A+B) - (C+D)}{A+B+C+D}$$

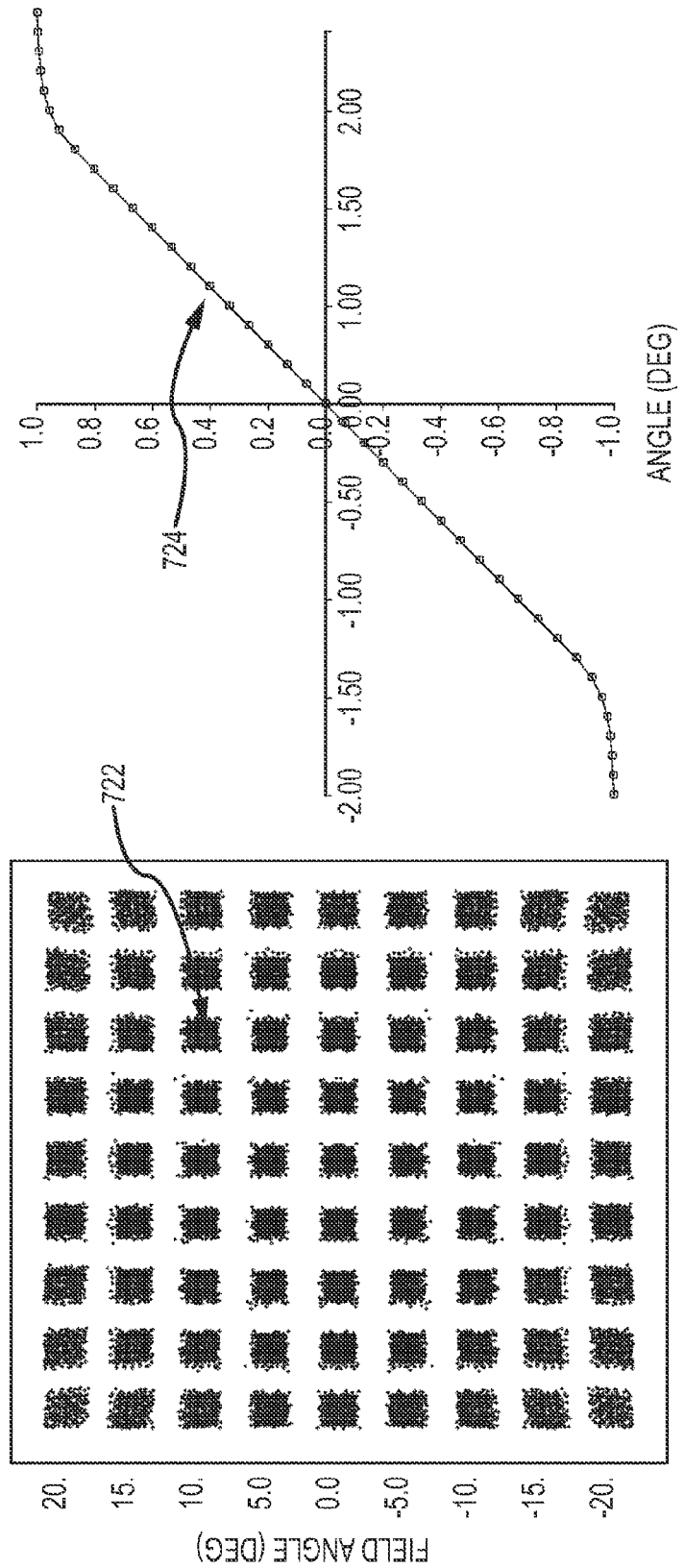

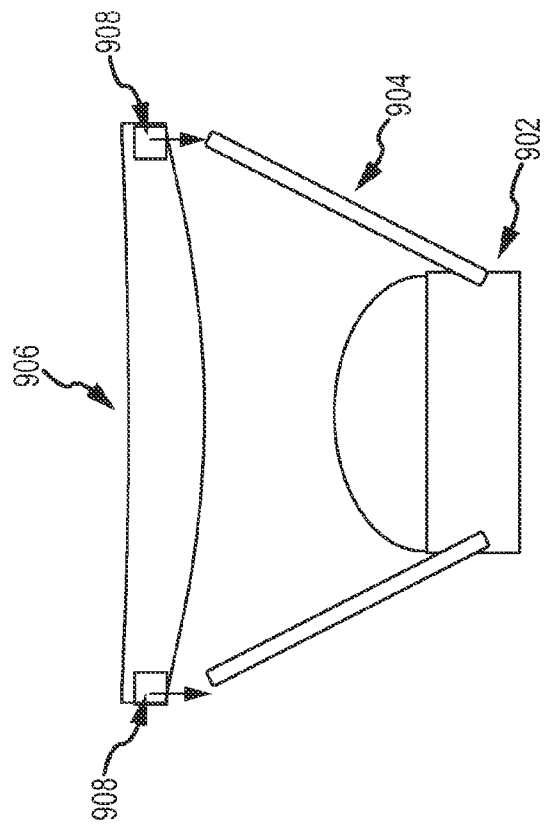
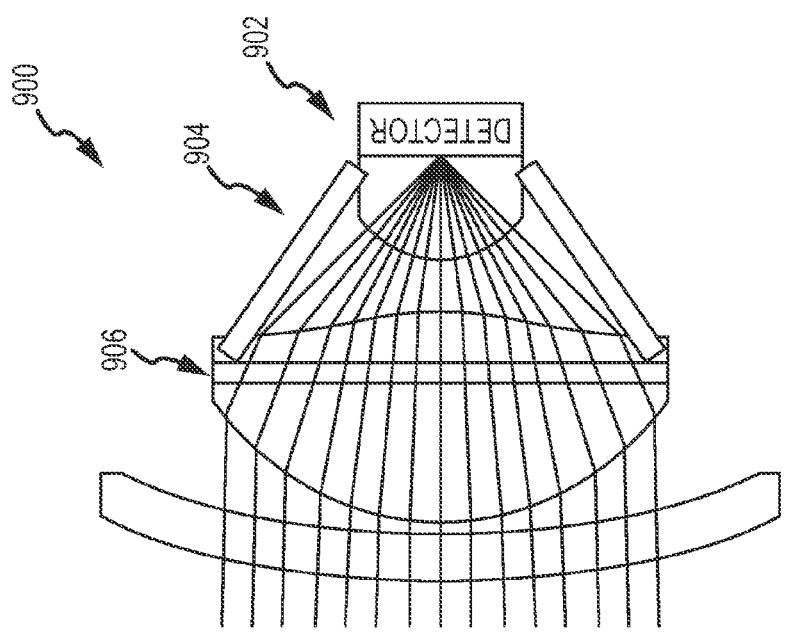

PROJECTILE GUIDANCE SYSTEM INCLUDING A COMPACT SEMI-ACTIVE LASER SEEKER WITH IMMERSED FILTER STACK AND FIELD LENS

BACKGROUND OF THE INVENTION

1. Field of the Invention

This disclosure relates to guidance systems for projectiles, missiles, and other ordinance that engages targets by detecting and following laser light scattered from the targets.

2. Description of the Related Art

Laser guided ordinance is commonly used to engage point targets with a high probability of success and minimal collateral damage. Such ordinance includes guided artillery projectiles, guided missiles, and guided bombs, all of which will be referred to herein as "projectiles".

A laser guided projectile typically includes a semi-active laser (SAL) seeker to detect pulsed laser electro-magnetic radiation (EMR) scattered from the intended target and to provide signals indicative of the target bearing such that the projectile can be guided to the target. The SAL may include a non-imaging optical system to capture and focus the scattered laser EMR onto a detector. The optical system may convert the target bearing to an irradiance distribution or "spot" positioned on the detector. As the target bearing changes the position of the spot on the detector changes. In order to provide high sensitivity, the SAL optical system may have a large aperture and high optical efficiency.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a compact SAL seeker for a projectile guidance system.

The SAL seeker comprises an optical sub-assembly that focuses incident electro-magnetic radiation (EMR) such that target bearing in object space is mapped to a spatial irradiance in image space and a detector sub-assembly to generate at least one guidance signal in response to the position of the centroid of the focused EMR. The optical sub-assembly includes an integrated filter stack of a primary optical element, a spreader, a filter and secondary optical element in which at least one and typically both of the spreader and filter are immersed within the optical media of the stack. The detector sub-assembly may include a field lens in which the detector is immersed. This increases the effective field-of-view (FOV). Immersion reduces the number of "air-to-glass" interfaces, hence improves throughput. The detector sub-assembly may be integrally formed with a mounting bracket adapted to mate with mounting features on the optical sub-assembly to provide a self-aligned seeker.

In an embodiment, the optical sub-assembly comprises a first (primary) optical element including a forward-facing first lens element configured to focus the EMR, a spreader configured to spatially homogenize EMR, a filter configured to reject EMR outside the detection band, and a second (secondary) optical element including an aft-facing second lens element configured to control the aberration characteristics of the EMR transmitted through the optical sub-assembly. The first optical element, spreader, filter and second optical element are bonded together in an integrated filter stack having only a first air-to-glass interface at the forward-facing first lens element and as second air-to-glass interface at the aft-facing second lens element. The placement of the spreader and filter will vary with application. The spreader may be, for example, a diffuser, a lenslet array or "wavy" surface. The forward-facing first lens element is the primary focusing element. This lens may, for example, be a positively-powered lens, an aspheric positively-powered lens, a Fresnel lens or a Fresnel lens formed on a positively-powered surface. The aft-facing second lens is preferably an aspheric lens. The lens may be positively-powered to provide additional focusing, flat or negatively-powered to defocus the EMR. A detector is coupled to the optical sub-assembly and configured to generate at least one guidance signal in response to the focused EMR. The detector may be mounted on the backside of a field lens, hence immersed. A mounting bracket may be integrally formed with the field lens and mated to mounting features formed in the second optical element. The first and second optical elements and the field lens and mounting structure may all be formed of the same plastic material.

In an embodiment, the filter and spreader are formed on a generally planar substrate and are immersed between the generally-planar second side of the first optical element, and the generally-planar first side of the second optical elements. The filter and spreader are suitably optical coatings.

In another embodiment, the filter and spreader are coatings formed on opposite sides of the second optical element with one of the coatings immersed.

In yet another embodiment, the spreader comprises an array of rectangularly-shaped lenslets. The lenslet array spatially homogenizes the EMR and forms a rectangular centroid at the detector. A rectangular centroid exhibits a substantially linear system transfer function. The lenslet array may be placed at any point in the sub-assembly; however placement of the lenslet array on the generally-planar second side of the first optical element allows the array to be planar and provides improved spatial homogenization of the EMR and a more uniform rectangular centroid across the FOV.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 8a and 8b are a spot diagram over the FOV and the system transfer function for the seeker depicted in FIGS. 7a and 7b; and FIGS. 9a and 9b are partial cross-sectional views of a self-aligned SAL seeker.

DETAILED DESCRIPTION OF THE INVENTION

The present invention describes a compact SAL seeker for a projectile guidance system. The compact SAL seeker includes an optical sub-assembly comprising an integrated filter stack of a primary lens element, spreader, filter and secondary lens element in which at least one and typically both of the spreader and filter are immersed within the optical media of the stack. The seeker also includes a detector sub-assembly comprising a detector, which may be mounted on the backside of a field lens, thus immersing the detector within the optical media of the field lens. Immersion reduces the number of "air-to-glass" interfaces. An "air-to-glass" interface is a well known term of art understood to mean the interface between an optical element and air in which the optical element may be formed of a glass, plastic or other material. The field lens may be integrally formed with a mounting bracket adapted to mate with mounting features in the secondary lens element to self-align the optical and detector sub-assemblies.

Figure 1:
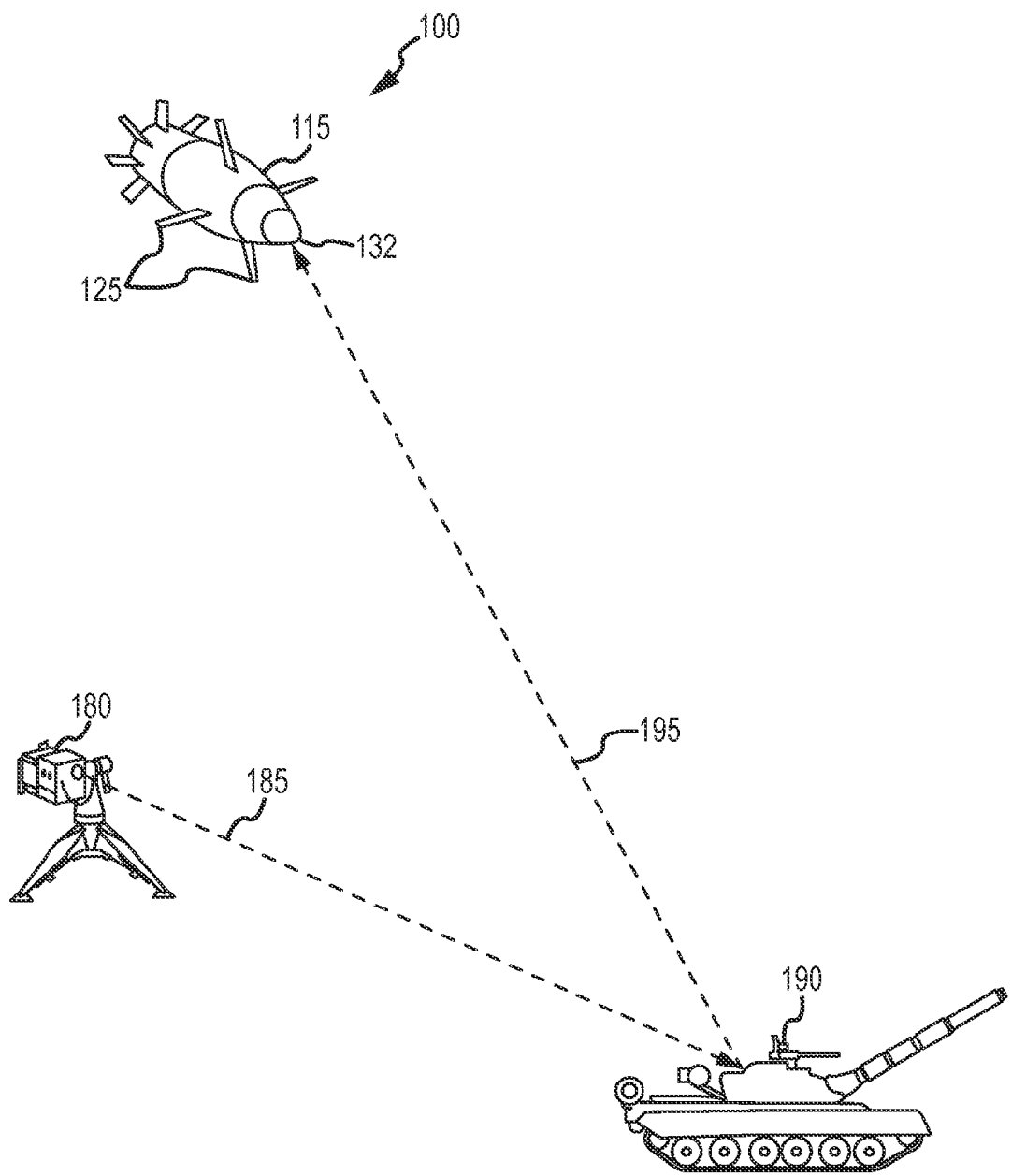
FIG. 1 is a schematic illustration of a laser guided projectile engaging a target.

Referring now to FIG. 1, a laser guided projectile 100 may engage a target 190 by detecting and following scattered laser radiation 195 from the target 190. In FIG. 1, the target 190 is represented as a tank, but may be another type of vehicle, ship, boat, or a structure, building or other stationary object. The target 190 may be illuminated with laser radiation 185 from a laser designator 180. The laser designator 180 may be located on the ground, as shown in FIG. 1, or may be located in a vehicle, ship, boat, or aircraft. The laser designator could be located on the projectile itself. This is typically referred to as an active laser seeker. The scattered laser radiation 195 is a portion of the illumination laser radiation 185.

The laser guided projectile 100 may include a projectile body 115, control surfaces 125, and a guidance system. The guidance system may include a SAL seeker, of which only a transmissive dome 132 is visible in FIG. 1. The guidance system may include a flight control system to control the flight of the laser guided projectile 100 by manipulating one or more control surfaces 125 based on at least one guidance signal from the SAL seeker. In the example of FIG. 1, the control surfaces 125 are shown as canards, but may be fins, wings, ailerons, elevators, spoilers, flaps, air brakes or other controllable devices capable of affecting the flight path of the laser guided projectile 100.

Figure 2:
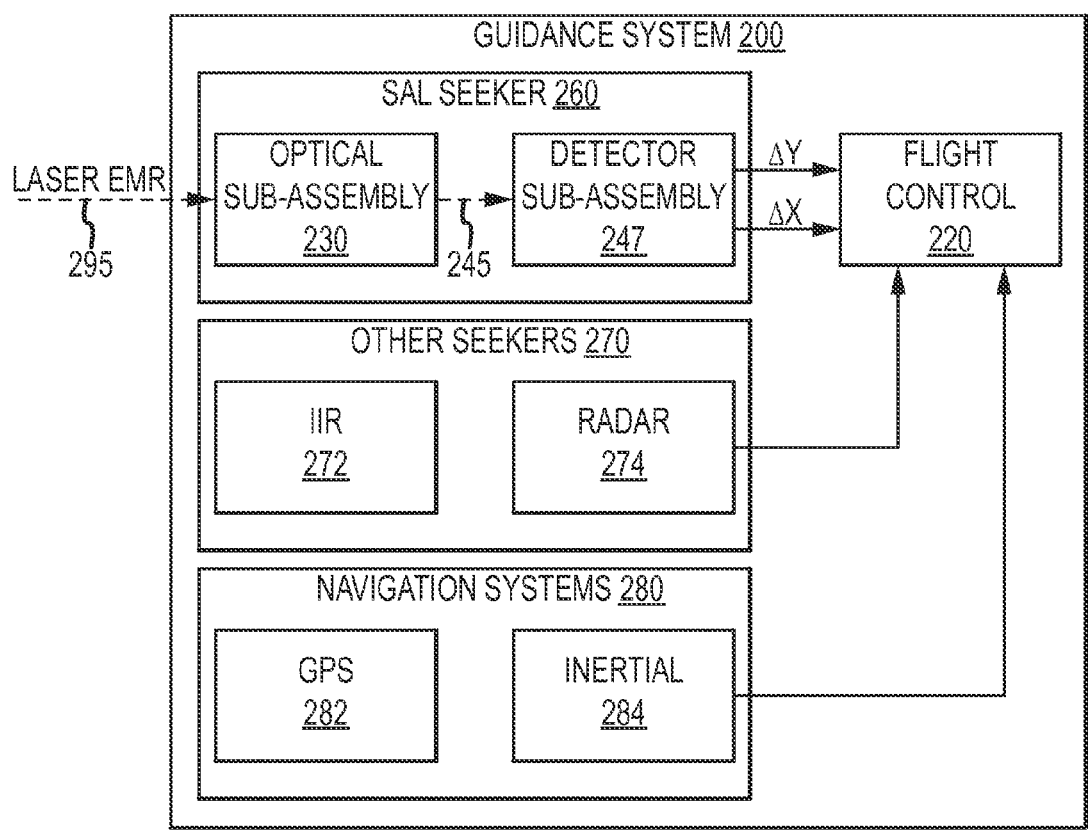
FIG. 2 is a block diagram of a guidance system.

Referring now to FIG. 2, a guidance system 200, which may be suitable for use in the projectile 100, may include a SAL seeker 260 and a flight control system 220. The SAL seeker 260 may include an optical sub-assembly 230 to capture and condense or focus laser EMR 295 scattered from a target to form an irradiance distribution ("centroid") or laser light "spot" 245 on a detector sub-assembly 247 including a detector 250. The SAL seeker 260 may provide at least one guidance signal indicative of a position of the laser light spot. The at least one guidance signal may include signals $\Delta X$ and $\Delta Y$ which are indicative of the position of the laser light spot 245 along two orthogonal axes. The position of the spot on the detector is indicative of the target bearing relative to the axis of the SAL seeker.

The guidance system 200 may optionally include one or more additional seekers 270, such as an imaging infrared (IIR) seeker 272 and/or a radar seeker 274. The guidance system 200 may optionally include one or more navigation systems 280, such as a global positioning system (GPS) 282 and/or an inertial navigation system 284.

The flight control system 220 may receive at least one guidance signal from the SAL seeker 260. The flight control system 220 may also receive guidance signals from the additional seekers 270 and navigations systems 280 when present. In response to the guidance signals, the flight control system 220 may control the flight of the projectile such that the projectile arrives at a designated target.

The flight control system 220 may include one or more processors that accept at least one guidance signal from the SAL seeker and generate control signals to control the flight or trajectory of a projectile such as the projectile 100. The flight control system 220 may include control actuators to convert the control signals into physical movements of control surfaces such as the canards 125 shown in FIG. 1.

Figure 3A:
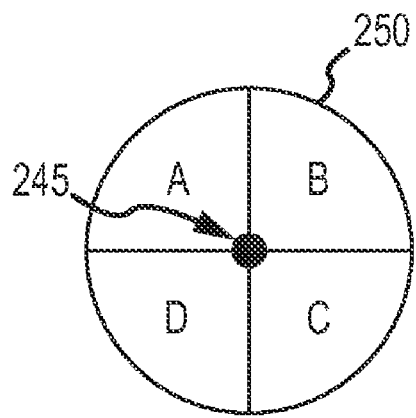
FIGS. 3a and 3b are an embodiment of an irradiance detector and its transfer function.
Figure 3B:
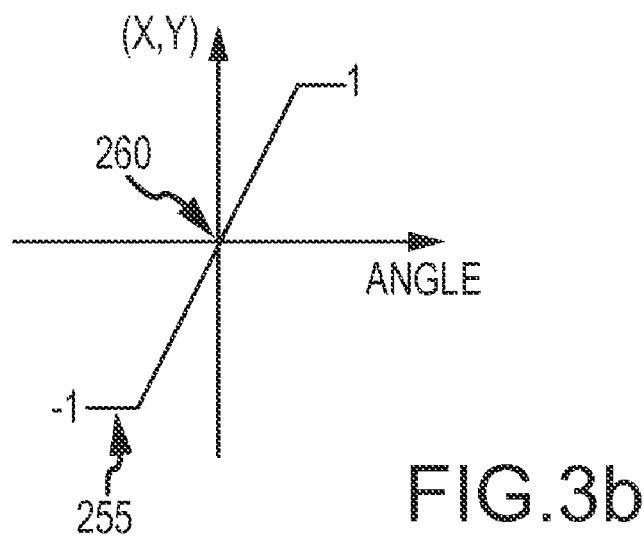

FIG. 3a shows a frontal view of the detector 250 and the focused laser spot 245. The detector 250 may comprise four quadrants A, B, C, D. Other detector configurations may be used. Each quadrant may produce a corresponding signal A, B, C, and D in response to the laser power incident upon each quadrant. Guidance signal $\Delta X$ may indicate an imbalance between the laser power incident upon the left (quadrants A and B) and right (quadrants C and D) halves of the detector 250. Guidance signal $\Delta Y$ may indicate an imbalance between the laser power incident upon the top (quadrants A and C) and bottom (quadrants B and D) halves of the detector 250. The terms "left", "right", "top", and "bottom" refer to the detector 250 as shown in FIG. 3a and do not imply any physical orientation of the detector 250 within a projectile such as the projectile 100. When the laser spot 245 is centered on the detector 250, the signals A, B, D may be essentially equal and the guidance signals $\Delta X$ and $\Delta Y$ may both be zero or nearly zero.

More particularly, the detector 250 may effectively measure the centroid of the incident EMR on the detector 250. The transfer function 255 is a ratio of the laser power on the different quadrants of the detector. When laser power in spot 245 is hitting all four quadrants A-D, the guidance system operates in a linear region 260 of the transfer function 255. The transfer function 255 in the linear region 260 determines the angle of the guidance system from the target (e.g. target bearing). When laser power is hitting only two quadrants, the guidance system operates outside the linear region, where the transfer function nears +/−1. The guidance system only knows the direction towards the target, but not its true angle. The site of the spot 245 may affect the performance of the guidance system. For example, a small spot tends to move off of overlapping multiple detector areas faster than a big spot. In the present application a larger spot improves the transfer function by making a relatively wide transfer function.

The position of SAL seeker 260 may be fixed within a projectile such as the projectile 100. This may be referred to as "body fixed" For example, the SAL seeker 260 may be disposed within the projectile 100 such that an optical axis of the SAL seeker 260 is aligned with a longitudinal axis of the projectile 100, in this case, the laser spot 245 may be centered on the detector 250 when the longitudinal axis of the projectile 100 is pointed directly at the designated target. The SAL seeker 260 may be mounted on a gimbal within the projectile 100 such that the optical axis of the SAL seeker 260 may be rotated with respect to the longitudinal axis of the projectile 100. In this case, the laser spot 245 may be centered on the detector 250 when the optical axis of the SAL seeker 260 is pointed directly at the designated target without the longitudinal axis of the projectile necessarily being pointed directly at the designated target.

Figure 4:
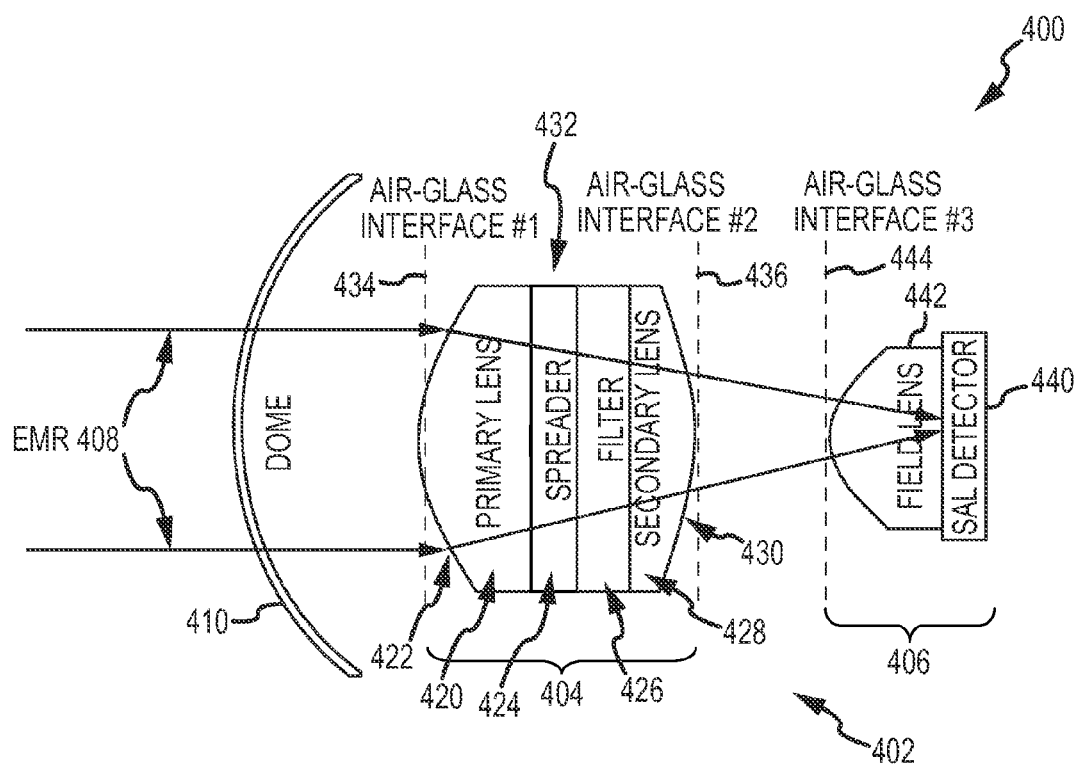
FIG. 4 is a block diagram of a SAL seeker with an immersed filter stack and field lens.

Referring now to FIG. 4, an exemplary SAL seeker 400 may include a seeker assembly 402 comprising an optical sub-assembly 404 and a detector sub-assembly 406. The optical sub-assembly may be disposed to receive EMR 408 from a laser scattered off a target through a transmissive dome 410. The optical sub-assembly converts target bearing to a spatial displacement of the laser spot or centroid at the detector plane. The detector senses spatial displacements of the laser spot and generates corresponding position signals. The SAL seeker 400 may also include circuitry (not shown in FIG. 4) that accept signals from the detector sub-assembly 406 and outputs at least one guidance signal for a projectile.

The dome 410 may be affixed to a body of a projectile (not shown in FIG. 4) such as the projectile 100. The dome 410 may be made of a transmissive material having sufficient mechanical integrity and abrasion resistance to withstand the launch and flight of the projectile. The term "transmissive" means that an element, such as the dome 410, transmits a substantial portion, though not necessarily all, of incident light at a specific wavelength or wavelength band of interest. The detection hand may span a range of 0.35 microns to 15 microns. The wavelength typically used for laser target designators is 1.06 microns although other wavelengths may be used. For example 1.55 microns may be used. The dome 410 may be made, for example, of glass, plastic, sapphire, aluminum oxynitride, ZnS, or other transmissive material. The dome 410 may be an essentially spherical shell having a concave outer surface essentially concentric with a concave inner surface. In this context and similar contexts, the term essentially is intended to mean "within reasonable manufacturing tolerances". The dome 410 may have a non-spherical shape selected, for example, to improve the aerodynamic performance of the projectile.

The optical sub-assembly 404 and the detector sub-assembly 406 may be affixed to the body of the projectile or may be mounted on a gimbal (not shown in FIG. 4) which allows the optical sub-assembly 404 and the detector sub-assembly 406 to collectively rotate about one or more axes that typically pass through the center of curvature of the dome 410. As described below with reference to FIGS. 9a-9b, the seeker sub-assembly 402 provides for easy mounting in either a body-fixed or gimbaled system. A mounting structure is integrally formed with the detector sub-assembly and the optical sub-assembly is "snapped" into place in mounting features formed therein.

Optical sub-assembly 404 comprises a first (primary) optical element 420 including a forward-facing first lens element 422 configured to focus the EMR, a spreader 424 configured to spatially homogenize EMR, a filter 436 configured to reject EMR outside the detection band, and a second (secondary) optical element 428 including an aft-facing second lens element 430 configured to control the aberration characteristics of the EMR transmitted through the optical sub-assembly. The first optical element 420, spreader 424, filter 426 and second optical element 428 are bonded together in an integrated filter stack 432 having only a first air-to-glass interface 434 at the forward-facing first lens element 422 and a second air-to-glass interface 436 at the aft-facing second lens element 430. The placement of the spreader 424 and litter 426 will vary with application.

The forward-facing first lens element 422 is the primary focusing element. This lens may, for example, be a positively-powered lens, an aspheric positively-powered lens, a Fresnel lens or a Fresnel lens formed on a positively-powered surface.

Thinking of EMR as a wave incident on the detector, the spreader 424 may comprise any suitable system for spatially homogenizing or intermixing various portions of the incident EMR wave received by the detector. For example, the spreader may comprise a diffuser, a lenslet array, a "wavy" surface, a diffractive optical element, or other optical spreading element. In various embodiments, the spreader spatially homogenizes the incident EMR by transmitting the EMR through an input aperture comprising a diffuser or multiple relatively small lenses ("lenslets") to overlap various portions of the incident EMR wave received by the detector. The angular spread of the spreader affects the range of the linear region of the transfer function. Thus, the spreader may be configured to deliver a selected width of the linear region of the transfer function over as desired signal collection angles.

The filter may be effective to prevent a substantial portion of incident light at wavelengths other than the specific wavelength or wavelength band of interest from reaching the detector. For example, considering a laser wavelength of 1.06 microns used in conjunction with a silicon-based detector, the filter rejects EMR at wavelengths less than approximately 1 micron. The response of the silicon detector rolls-off rapidly above approximately 1.1 microns thus providing the desired high pass filtering. The filter may, for example, be an optical coating or coatings designed to block certain wavelengths and transmit at least the wavelength of interest.

The aft-facing second lens element 430 is preferably an aspheric lens. The lens may be positively-powered to provide additional focusing, flat or negatively-powered to defocus the EMR. Additionally, this lens helps controls the aberration characteristics of the EMR transmitted through the optical sub-assembly.

Detector sub-assembly 406 comprises a detector 440 such as the four-quadrant detector shown in FIG. 3a coupled to the optical sub-assembly and configured in generate at least one guidance signal in response to the focused EMR. The detector sub-assembly may comprise a field lens 442. The detector 440 may be mounted on the backside of the field lens to immerse the detection surface. This increases the apparent size of the detector thus effectively increasing the FOV. If immersed the detector sub-assembly adds only a single air-to-glass interface 444. The elimination of air-to-glass interfaces improves throughput.

Figure 5:
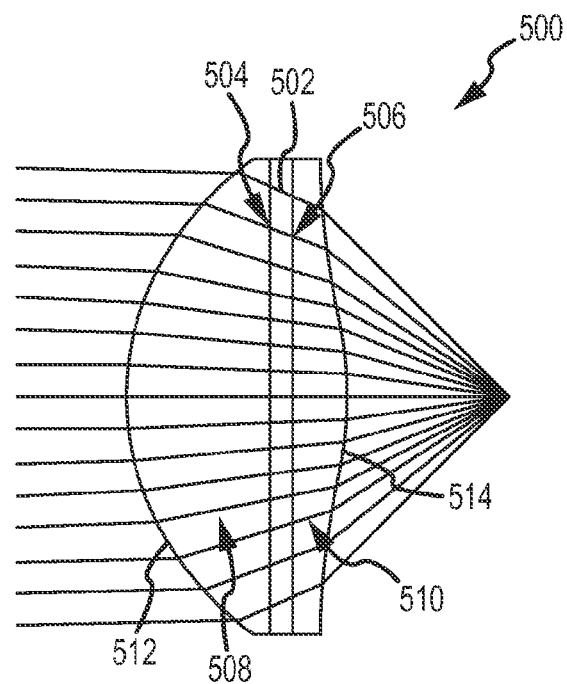
FIG. 5 is a partial cross-sectional view of a first embodiment of a seeker including a positively-powered primary element and an immersed optical flat with a diffuser and filter.

Referring now to FIG. 5, an embodiment of an optical sub-assembly 500 comprises an optical substrate or "flat" 502. A diffuser coating 504 and a filter coating 506 are formed on opposite sides of the flat. The diffuser intermixes various portions of the incident EMR wave to spatially homogenize the focused EMR received by the detector. The diffuser may be selected and/or configured according to any appropriate criteria. For example, the diffuser may comprise as light shaping diffuser from Physical Optics Corporation, which may produce Gaussian spread profiles and high throughput. Flat 502 is placed between the generally-planar backside of the primary optical element 508 and secondary optical element 510 so that both the diffuser coating and filter coating are immersed. As shown, diffuser coating 504 is placed at the backside of the primary optical element 508 to be as close as possible to the "stop" of the optical sub-assembly. In this particular embodiment, the primary optical element includes an aspheric positively-powered forward surface 512 that provides the majority of the focusing power. The primary optical element may be a positively-powered lens without aspheric correction, a Fresnel lens or a Fresnel lens formed on a positively-powered surface. In this particular embodiment, the secondary element includes an aspheric positively-powered tot aid surface 514 that provides aberration correction and secondary focusing.

Figure 6:
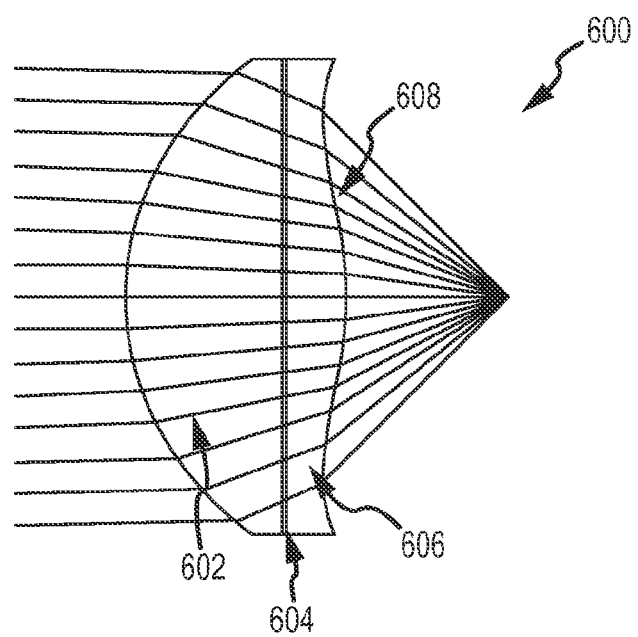
FIG. 6 is a partial cross-sectional view of an embodiment of a seeker in which the spreader is formed as a wavy surface on the aft side of the secondary optical element.
Figure 7A:
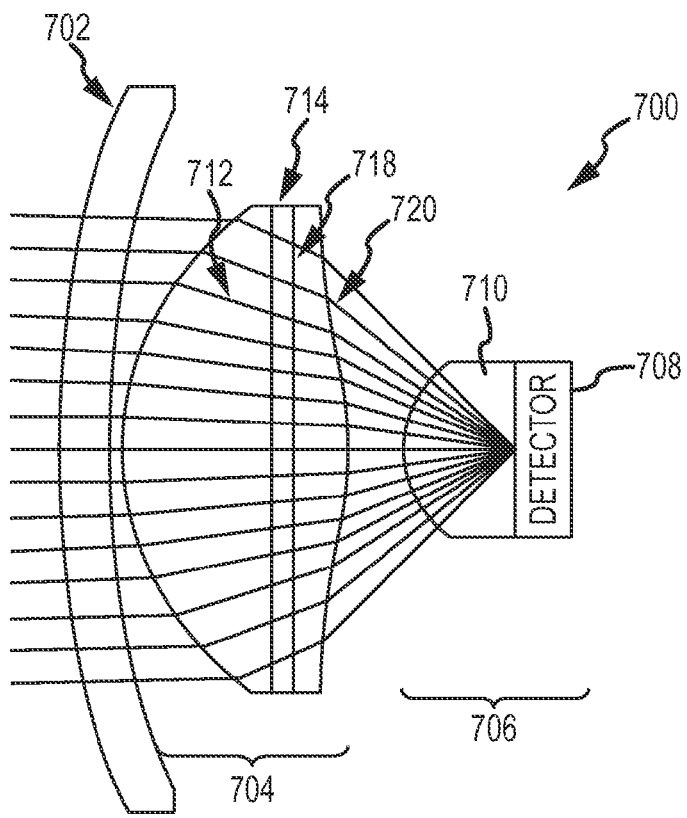
FIGS. 7a and 7b are a partial cross-sectional view of an embodiment of a seeker using a lenslet array to both spatially homogenize EMR and to form a rectangularly-shaped centroid on the detector with an exemplary lenslet array.
Figure 7B:
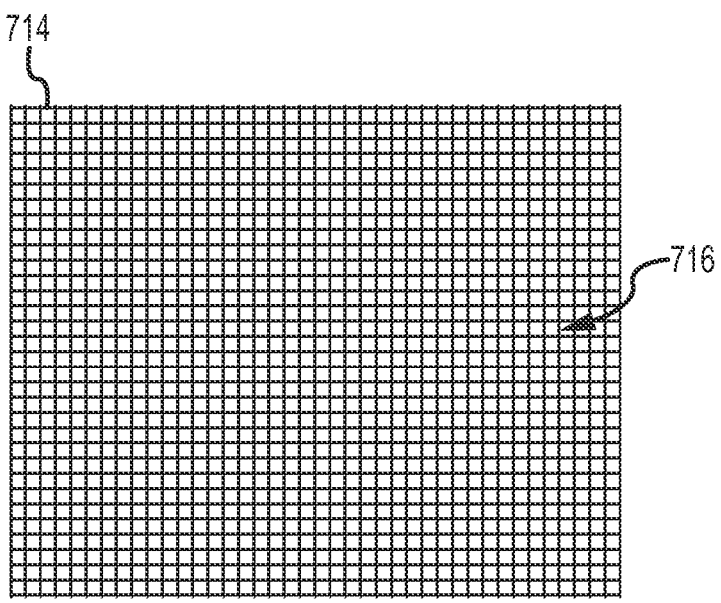

Referring now to FIG. 6, an embodiment of an optical sub-assembly 600 comprises a primary lens element 602, a filter 604 a secondary lens element 606 and a spreader 608 comprising an undulating pattern mapped onto a curvilinear aft-surface of the secondary lens element. The curvilinear surface is adapted to focus the EMR on the detector. The undulating surface intermixes various portions of the incident EMR wave to spatially homogenize the focused EMR received by the detector. Alternately, the undulating pattern could be mapped onto a flat aft-surface.

Representative undulating patterns may include, for example: a regular pattern, an irregular pattern, a chaotic pattern, a random pattern, a mathematically functionalized pattern, a sinusoidal pattern, a uniformly corrugated pattern, a non-uniformily corrugated pattern, a pattern resulting from a relatively high frequency of oscillation, a pattern resulting from a medium frequency of oscillation, a pattern resulting from a relatively low frequency of oscillation, a pattern resulting from a radially dependent variation in amplitude, a pattern resulting from a radially dependent variation in frequency, aspheric topological features to account for higher order correction of optical aberrations, as well as any other type of pattern, whether now known or otherwise hereafter described in the art. It will be appreciated that a variety of patterns may be applied as mapped onto a curvilinear surface in order to produce a substantially similar result as provided by the instant invention.

Referring now to FIGS. 7a-7b and 8a-8b, an embodiment of an optical seeker assembly 700 includes a dome 702, an optical sub-assembly 704 and a detector sub-assembly 706 including an irradiance detector 708 mounted on a field lens 710. Optical sub-assembly 704 includes a primary optical element 712, a lenslet array 714 including a plurality of rectangularly-shaped lenslets 716, a filter 718 and a secondary optical element 720. Lenslet array 714 serves both to spatially homogenize the EMR and to produce a rectangularly-shaped centroid 722 at the detector. A rectangularly-shaped centroid produces a substantially linear transfer function 724. Although the lenslet array 714 can be placed at any surface in the integrated filter stack, it is suitably placed on the generally planar aft side of primary optical element 712 near the "stop" of the optical system. This improves both the performance of the spatial homogenization and the uniformity of the rectangular centroid across the FOV. Filter 718 may be a filter coating formed on the lenslet array 716 or on the front side of the secondary optical element, for example.

Lenslet array 714 subdivides the optical systems input aperture into distinct subregions, where each subregion illuminates a relatively large spot centered on the detector. The lenslet array 714 forms the subregions using an array of small lenses or "lenslets" 716. The lenslets spread the incident EMR wave passing through the array. Each lenslet in the array may produce a fixed angular spread.

In the present embodiment, the array of lenslets comprises a structure having a substantially homogeneous index of refraction and varying thicknesses for forming the lenslets. The extent to which the lenslets spatially homogenized the focused EMR wave at the detector corresponds to the number and configuration of the lenslets. Alternatively, the array may comprise a structure having a heterogeneous index of refraction and a substantially constant thickness, producing the same effect as a plurality of lenslets. Further, the array may comprise a material having a substantially heterogeneous index of refraction and varying thicknesses. The varying indices of refraction and the varying thicknesses both provide spatial homogenizing of the incident EMR wave reaching the detector.

Referring now to FIGS. 9a and 9b, a self-aligned optical seeker assembly 900 may comprise a detector sub-assembly 902 having a mounting structure 904 integrally formed there with and an optical sub-assembly 906 having mounting features 908 formed therein so that the two sub-assemblies may "snap" together to form a self-aligned seeker. These self-centering molded in features may decrease assembly time and calibration, hence cost. The primary, secondary and field lens, mounting structure and possibly the lenslet array may be all formed from the same material e.g. a plastic.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A guidance system, comprising:
    a non-imaging optical system to focus incident electromagnetic radiation (EMR) in a detection band including at least one wavelength in a range of 0.35 microns to 15 microns, comprising:
        a first optical element having a first side and a second side, wherein the first side is a first lens element configured to focus incident EMR;
        a spreader configured to spatially homogenize EMR transmitted through the optical system;
        a filter configured to reject EMR including wavelengths outside the detection band; and
        a second optical element having a first side and a second side, wherein the second side is a second lens element configured to control the aberration characteristics of the EMR transmitted through the optical system;
        said first optical element, spreader, filter and second optical element optically bonded together in an integrated filter stack having only a first air-to-glass interface at the first side of the first optical element and a second air-to-glass interface at the second side of the second optical element, and
    an irradiance detector coupled to the optical system and configured to generate at least one guidance signal in response to the spatial displacement of the centroid of the focused incident EMR in the detection band.

2. The guidance system of claim 1, wherein the first lens element comprises one of a positively powered lens, an aspheric positively powered lens, a Fresnel lens formed on a positively powered surface and a Fresnel lens formed on a generally planar surface.

3. The guidance system of claim 1, wherein the second lens element comprises an aspheric lens.

4. The guidance system of claim 3, wherein the second lens comprises the aspheric lens formed on a positively powered surface.

5. The guidance system of claim 1, wherein the spreader comprises a diffuser.

6. The guidance system of claim 1, wherein the spreader comprises an array of lenslets.

7. The guidance system of claim 6, wherein each said lenslet has a rectangular shape.

8. The guidance system of claim 1, wherein the second side of the first optical element and the first side of the second optical element are generally planar, further comprising a generally planar optical substrate having a first side that supports the spreader and a second side that supports the filter.

9. The guidance system of claim 8, wherein the spreader faces the second side of the first optical element.

10. The guidance system of claim 8, wherein the spreader comprises a diffuser coating on the first side of the optical substrate and the filter comprises a filter coating on the second side of the optical substrate.

11. The guidance system of claim 1, wherein the second side of the first optical element and the first side of the second optical element are generally planar and bonded together, said spreader and filter on opposite sides of the second optical element.

12. The guidance system of claim 11, wherein the spreader faces the second side of the first optical element and the filter is at the second air-to-glass interface.

13. The guidance system of claim 1, wherein the spreader comprises an array of rectangularly-shaped lenslets positioned at the second side of the first optical element.

14. The guidance system of claim 1, further comprising:
a detector assembly, comprising:
a third optical element having a first side and a second side, wherein the first side is a field lens element and the second side is generally planar, and
said detector, said detector mounted on the generally planar second side of said third optical element facing the optical system.

15. The guidance system of claim 14, further comprising:
a mounting bracket that mounts the integrated filter stack to the detector assembly, said third optical element integrally formed with said mounting bracket and said second optical element comprising mounting features to mate with said mounting bracket.

16. A guidance system, comprising:
a non-imaging optical system to focus incident electromagnetic radiation (EMR) in a detection band including at least one wavelength in a range of 0.35 microns to 15 microns, comprising:
a first optical element having a first side and a second side, wherein the first side is a first lens element configured to focus incident EMR and the second side is generally planar;
a filter including a generally planar substrate having a first side that comprises a diffuser coating to spatially homogenize EMR transmitted through the optical system and a second side that comprises a filter coating to reject EMR including wavelengths outside the detection band; and
a second optical element having a first side and a second side, wherein the first side is generally planar and second side is a second lens element configured to control the aberration characteristics of the EMR transmitted through the optical system, said first optical element, filter and second optical element optically bonded together in an integrated filter stack having only a first air-to-glass interface at the first side of the first optical element and a second air-to-glass interface at the second side of the second optical element; and
a detector assembly, comprising:
a third optical element having a first side and a second side, wherein the first side is a field lens element and the second side is generally planar; and
an irradiance detector mounted on the generally planar second side of said third optical element facing the integrated filter stack and configured to generate at least one guidance signal in response to the spatial displacement of the centroid of the focused incident EMR in the detection band.

17. A guidance system, comprising:
a non-imaging optical system to focus incident electromagnetic radiation (EMR) in a detection band including at least one wavelength in a range of 0.35 microns to 15 microns, comprising:
a first optical element having a first side and a second side, wherein the first side is a first lens element configured to focus incident EMR and the second side is generally planar;
an array of rectangular-shaped lenslets to spatially homogenize EMR transmitted through the optical system;
a filter to reject EMR including wavelengths outside the detection band; and
a second optical element having a first side and a second side, wherein second side is a second lens element configured to control the aberration characteristics of the EMR transmitted through the optical system, said first optical element, array of rectangularly-shaped lenslets, filter and second optical element optically bonded together in an integrated filter stack having only a first air-to-glass interface at the first side of the first optical element and a second air-to-glass interface at the second side of the second optical element; and
a detector assembly, comprising:
a third optical element having a first side and a second side, wherein the first side is a field lens element and the second side is generally planar; and
a irradiance detector mounted on the generally planar second side of said third optical element facing the integrated filter stack and configured to generate at least one guidance signal in response to the spatial displacement of the rectangularly-shaped centroid of the focused incident EMR in the detection band.

18. The guidance system of claim 17, wherein the array of rectangularly-shaped lenslets are bonded to the second side of the first optical element, said filter positioned at between the second side of the first optical element and the first side of the second optical element.

19. A guidance system, comprising:
an optical sub-assembly to focus incident electro-magnetic radiation (EMR) in a detection band including at least one wavelength in a range of 0.35 microns to 15 microns, comprising:
a first optical element having a first side and a second side, wherein the first side is a first lens element configured to focus incident EMR;
a spreader configured to spatially homogenize EMR transmitted through the optical system;
a filter configured to reject EMR including wavelengths outside the detection band; and
a second optical element having a first side and a second side, wherein the second side is a second lens element configured to control the aberration characteristics of the EMR transmitted through the optical system, said second lens element formed with mounting features;
said first optical element, spreader, filter and second optical element optically bonded together in an integrated filter stack having only a first air-to-glass interface at the first side of the first optical element and a second air-to-glass interface at the second side of the second optical element; and
a detector sub-assembly comprising:
a third optical element having a first side and a second side, wherein the first side is a field lens element;
a mounting bracket integrally formed with said third optical element and mated with the mounting features formed in said second lens element; and
an irradiance detector coupled to the optical system and configured to generate at least one guidance signal in response to the spatial displacement of the centroid of the focused incident EMR in the detection band.

20. The guidance system of claim 19, wherein said first, second and third optical element and said mounting bracket all comprise the same plastic material.

21. The guidance system of claim 19, wherein the second side of the third optical element is generally planar, said detector mounted on said generally planar second side.

22. The guidance system of claim 19, wherein the spreader comprises an array of rectangularly-shaped lenslets that spatially homogenize the EMR and produce a rectangularly-shaped centroid of focused EMR on the detector.

23. The guidance system of claim 19, wherein the second side of the first optical element and the first side of the second optical element are generally planar, further comprising a generally planar optical substrate having a first side that supports the spreader and a second side that supports the filter.

* * * * *